United States Patent
Kuipers et al.

(10) Patent No.: US 8,867,712 B2
(45) Date of Patent: Oct. 21, 2014

(54) ADJUSTING A POWER ALLOCATION OF USERS IN A DIGITAL SUBSCRIBER LINE ENVIRONMENT

(75) Inventors: Martin Kuipers, Dallgow-Döberitz (DE); Anja Klein, Darmstadt (DE); Dominique Würtz, Darmstadt (DE)

(73) Assignee: Adtran GmbH, Berlin-Siemensstadt (DE)

( * ) Notice: Subject to any disclaimer, the term of this patent is extended or adjusted under 35 U.S.C. 154(b) by 0 days.

(21) Appl. No.: 13/697,644

(22) PCT Filed: May 12, 2010

(86) PCT No.: PCT/EP2010/056577
§ 371 (c)(1),
(2), (4) Date: Jan. 25, 2013

(87) PCT Pub. No.: WO2011/141064
PCT Pub. Date: Nov. 17, 2011

(65) Prior Publication Data
US 2013/0208876 A1    Aug. 15, 2013

(51) Int. Cl.
*H04B 3/32* (2006.01)
*H04L 5/00* (2006.01)
*H04B 3/46* (2006.01)

(52) U.S. Cl.
CPC ............. *H04B 3/32* (2013.01); *H04L 5/0007* (2013.01); *H04L 5/0037* (2013.01); *H04L 5/00* (2013.01); *H04B 3/464* (2013.01)
USPC ............. 379/93.08; 379/417; 379/22.02; 375/346; 375/224; 375/225; 375/285

(58) Field of Classification Search
CPC ........... H04M 1/76; H04M 7/00; H04M 1/24; H04M 3/08; H04M 3/22; H04M 11/00
USPC .......................................... 379/22.02, 93.08
See application file for complete search history.

(56) References Cited

U.S. PATENT DOCUMENTS

| | | | |
|---|---|---|---|
| 7,158,563 B2 * | 1/2007 | Ginis et al. | ............... 375/224 |
| 2012/0257691 A1 | 10/2012 | Ginis et al. | |

FOREIGN PATENT DOCUMENTS

WO          02100008 A1    12/2002

OTHER PUBLICATIONS

Cendrillon R. et al.: "Optimal Multi-user Spectrum Management for Digital Subscriber Lines", 2004 IEEE International Conference on Communications Jun. 20-24, 2004 Paris, France, vol. 1, Jun. 20, 2004-Jun. 24, 2004, pp. 1-5, XP002612451.
Tsiaflakis P. et al.: Convex Relaxation Based Low-Complexity Optimal Spectrum Balancing for Multi-User DSL, in Acoustics, Speech and Signal Processing, 2007, ICASSP 2007, IEEE International Conference, vol. 3, pp. II-349 to III-352, Apr. 2007.

* cited by examiner

*Primary Examiner* — Joseph J Nguyen
(74) *Attorney, Agent, or Firm* — Laurence A. Greenberg; Werner H. Stemer; Ralph E. Locher

(57) ABSTRACT

A method and a device adjust a power allocation of users in a digital subscriber line environment. An intermediate power allocation is determined for at least one user initializing with the digital subscriber line environment based on a new power allocation determined for the digital subscriber line environment containing the at least one user. The intermediate power allocation provides a predefined minimum signal-to-noise ratio margin for the active users of the digital subscriber line environment. Furthermore, a communication system can contain such a device.

6 Claims, 6 Drawing Sheets

ADJUSTING A POWER ALLOCATION OF USERS IN A DIGITAL SUBSCRIBER LINE ENVIRONMENT

BACKGROUND OF THE INVENTION

Field of the Invention

The invention relates to a method and to a device for adjusting a power allocation of users in a digital subscriber line environment. In addition, a system comprising at least one such device is suggested.

DSL or xDSL, is a family of technologies that provide digital data transmission in particular over wires of a local telephone network.

High speed Internet access is gaining importance and can be via xDSL services using existing copper lines. Also, other applications emerge that require broadband transmission services, e.g., triple play offers comprising subscriber access to Internet, TV and voice data transmission. A bandwidth consuming application is the transmission of TV data via xDSL, wherein one HDTV channel may require a data rate amounting to 12 Mbit/s.

Therefore, requirements for high speed Internet access are increasing. Operators are optimizing services that are offered to their customers. This becomes a difficult task as an increasing amount of users as well as high data rates leads to higher crosstalk between subscriber lines in a cable binder. In most cases, crosstalk noise limits the performance. However, also crosstalk noise may vary over time: There may be low crosstalk noise when a significant amount of customers have switched off their equipment and there may be a considerable amount of crosstalk noise during business hours when the majority of customers use their devices.

FIG. 1 shows a schematic diagram of a cable or binder 101 comprising several lines 102, 103 of a DSL system. The lines 102 and 103 are connected at one side to a DSLAM 104 that could be deployed at a central office or at a remote terminal and on the other side the line 102 is connected to a CPE 105 and the line 103 is connected to a CPE 106.

Crosstalk occurs between the lines 102 and 103 that are coupled by the binder 101: The crosstalk comprises a near-end crosstalk (NEXT) 107 and 108 as well as far-end crosstalk (FEXT) 109 and 110.

Such crosstalk is perceived at a receiver of a victim (coupled) line as noise and therefore decreases a signal-to-noise ratio (SNR) at this receiver thereby reducing an attainable data rate on this line.

The twisted pair communication channel is frequency selective, i.e. the direct channel attenuates higher frequencies more than lower frequencies, but the electromagnetic coupling between twisted pair lines provides higher crosstalk with increasing frequency.

xDSL systems employing multi-carrier modulation schemes like Discrete Multi-Tone (DMT) are able to flexibly shape their transmit power spectrum in order to adapt to frequency-selective characteristics of the channel. Dynamic Spectrum Management (DSM) Level 2 is an approach to improve an overall system performance by centrally shaping transmit spectra (which corresponds to shaping of power allocations) of interfering lines so that a performance loss due to crosstalk effects is minimized. With enough (in particular full) knowledge about the channel characteristics, a Spectrum Management Center (SMC) is able to compute an optimal power allocation for each user and reports these allocations to the individual modems, which utilize the power allocation determined by the SMC to configure a transmit power level for each tone (of the DMT modulation scheme).

FIG. 2 shows a schematic diagram of an optimal downstream power allocation for a VDSL2 system with two users (with different loop lengths amounting to 300 m for the first user and to 600 m for the second user) determined by a SMC using DSM. It is noted that user in this regard may in particular refer to a CPE or a terminal. The user may in particular be a DSL modem. Hence, FIG. 2 comprises a power spectrum density (PSD) mask 201 which can be utilized by both users, wherein a PSD allocation of the first user (the 300 m user) is indicated by a graph 202 and a PSD allocation of the second user (the 600 m user) is indicated by a graph 203.

The SMC assigns the frequency band above ca. 8 MHz exclusively to the 300 m user (see graph 202), because the 600 m user (see graph 203) cannot efficiently transmit data at this range due to high direct channel attenuation. In a range below 8 MHz, the SMC instructs the 300 m user (see graph 202) to reduce its transmit power in order to limit its interference with the 600 m user.

The power allocation provided by the SMC may provide a target SNR margin, which protects the users of the DSM system from (arbitrary or not expected) noise fluctuations, e.g., crosstalk from legacy systems or other interferers. In this regard, a target margin of, e.g., 6 dB can be provided to ensure a specified service quality, i.e. bit-error-ratio (BER) and data rate. Hence, the actual noise may increase by up to 6 dB relative to the noise level that has been assumed by the SMC when computing the power allocations.

FEXT between copper wires in a binder is the dominant impairment in current DSL systems, severely limiting achievable data rates. DSM Level 2 tries to mitigate the capacity loss due to crosstalk by centrally coordinating the modem's transmit power allocation, effectively introducing politeness between users. Existing solutions, however are not able to cope with a scenario that some optimal joint power allocation computed by an SMC according to current channel conditions may become invalid at some point in the future when the channel or DSM system parameters change, e.g., (a) when a user joins or leaves the system. This is likely to happen in an unbundled environment where customers change service providers, which operate their proprietary DSM system.
(b) when a user changes a service. If a user upgrades, e.g., from an ADSL2 service to a VDSL2 service, the transmit spectrum will change thereby affecting the crosstalk profile on other users' lines in the binder.

In any such event, the SMC has to determine a new joint allocation that corresponds to the new situation. However, it is a significant problem that transmit spectra of modems that are already active (in show-time) cannot be reconfigured without interrupting their service, which in most cases is inacceptable and should therefore be avoided. Instead, updating the transmit power profile is thus delayed until a modem enters a (re-)initialization phase.

However, updating spectra for a part of the users only leads to a power allocation comprising a mixture of merely partially optimized spectra. Such mixture bears the risk that a desired target BER cannot be guaranteed as long as the final state of the new power allocation is not reached, i.e. as long as not all modems have been re-initialized according to the new power allocation. Until such final state is reached, it is likely to obtain severe drops of the SNR margin thus seriously affecting an overall line stability.

BRIEF SUMMARY OF THE INVENTION

The problem to be solved is to overcome the disadvantages mentioned above and in particular to provide an efficient solution to adapt power allocations in a DSM system.

This problem is solved according to the features of the independent claims. Further embodiments result from the depending claims.

In order to overcome this problem, a method is provided for adjusting a power allocation of users in a digital subscriber line environment,
- wherein an intermediate power allocation is determined for at least one user initializing with the digital subscriber line environment based on a new power allocation determined for the digital subscriber line environment comprising this at least one user;
- wherein the intermediate power allocation provides a predefined minimum SNR margin for the active users of the digital subscriber line environment.

It is noted that the new power allocation corresponds to a target power allocation value comprising in particular a power spectrum density distribution over a frequency range. It is also noted that the power allocation can be also referred to as a (e.g., transmit) spectrum.

It is further noted that user refers to a terminal, a CPE or a modem. The user can be initialized to become an active user (i.e. to enter an active mode, also referred to as "show-time").

Advantageously, said minimum SNR margin can be provided for all active users of the digital subscriber line environment, i.e. for all users that are in show-time. Hence, the PSD of the at least one user that joins the digital subscriber line environment is adjusted such that it converges towards the new power allocation and that it does not interfere with already active users in a way that their SNR drops below said minimum SNR margin. The intermediate power allocations (of the transition phase towards the new power allocation) can be determined such that an SNR margin for all users does not fall below said predefined minimum SNR margin.

Via said intermediate power allocation, a transition is provided that allows the DSL environment to gradually adjust to and eventually reach the new power allocation without a significant impairment to existing users.

Hence, the solution provided allows to gradually update power allocations in a DSM system and assures that at each point during such gradual transition, an actual SNR margin for each user does not fall below a given minimum value.

Advantageously, only transmit spectra (or power allocations) of users initializing a new session are modified and a forced retraining can largely be avoided.

In an embodiment, at least one intermediate power allocation is determined that converges towards the new power allocation.

In particular, with at least one user that is about to (re-)initialize with the DSL environment, an(other) intermediate power allocation stage can be determined. Hence, the approach can be iteratively applied to converge via several intermediate power allocations toward the new (target) power allocation.

It is noted that initializing refers to a user that wants to get connected (or re-connected) to the DSL environment.

The updating scheme suggested advantageously updates or adjusts the power allocation if a user (re-)initializes a new session.

In another embodiment, the digital subscriber line environment comprises at least one DSM system, which is managed by an SMC.

The SMC may be a centralized component that provides the adjustment of power allocations. Also the SMC may be realized as at least one physical entity or it may be combined with an existing physical entity.

In a further embodiment, the predefined minimum SNR margin can be provided for the intermediate power allocation or individually for each user for which the intermediate power allocation is determined or for every subcarrier or a portion of users or subcarriers.

In a next embodiment, the intermediate power allocation is determined utilizing spectral limitation masks as well as a limited power budget per the at least one user, which limited power budget is in particular distributed among tones of a DMT modulation scheme.

It is also an embodiment that the intermediate power allocation is determined such that a distance metric between an actual power allocation and the new power allocation is reduced, in particular minimized.

Pursuant to another embodiment, the distance metric is reduced meeting at least one of the following constraints:
- a total transmit power is limited;
- a transmit power on each sub-carrier or tone is limited individually by a power spectrum density mask;
- for the minimum SNR margin, a data rate achieved by each user with the obtained power allocation equals or exceeds a predetermined target data rate.

In a next embodiment, the distance metric according to $\Delta(s(i), s_{new})$ comprises at least one of the properties:
- $\Delta$ is convex in $s_k^n$;
- $\Delta$ is separable in $s_k^n$; and
- $\Delta(s(i), s_{new})$ has a unique global minimum for $s(i)=s_{new}$.

According to an embodiment, the distance metric comprises a distance function as follows:

$$\Delta(s(i), s_{new}) = \sum_n \sum_k \left(\frac{s_k^n(i)}{s_{k,new}^n} - 1\right)^2,$$

or $$\Delta(s(i), s_{new}) = \sum_n \sum_k \alpha_k^n (s_k^n(i) - s_{k,new}^n)^2,$$

or $$\Delta(s(i), s_{new}) = \sum_n \sum_k \alpha_k^n \left(\frac{s_k^n(i)}{s_{k,new}^n} - \frac{s_{k,new}^n}{s_k^n(i)}\right)^2,$$

wherein
$s_k^n$ denotes a PSD of the transmit signal of a user n;
k determines a subchannel or tone;
$s_{new}$ is the new power allocation;
s(i) is the intermediate power allocation at a step i.

It is noted that the term $s_{k,new}^n$ can be set to a small positive value.

According to another embodiment, the intermediate power allocation is determined by solving the following optimization problem:

$$\min_{s_k^n(i) \forall n \in \mathcal{G}_i, k} \Delta(s(i), s_{new})$$

$$\text{s.t.} \quad R^n(\overline{\gamma})|_{s(i)} \geq R_{target}^n \quad \forall n$$

$$\sum_k s_k^n(i) \leq P_{max}^n \quad \forall n$$

$$0 \leq s_k^n(i) \leq s_{k,mask}^n \quad \forall n, k$$

wherein
$n \Sigma \mathcal{N}_i \subseteq \mathcal{G}$ is a user;
$\mathcal{G}_i$ determines a group comprising the at least one user initializing with the digital subscriber line environment;
$\mathcal{N}$ determines the users sharing the same binder;

$s_k^n$ denotes a PSD of the transmit signal of a user n;
$s_{k,mask}^n$ is a PSD mask determined by a band profile used;
k determines a subchannel or tone;
$s_{new}$ is the new power allocation;
s(i) is the intermediate power allocation at a step i;
$\bar{\gamma}$ is the predetermined minimum SNR margin;
$R^n$ is a data rate of the user n;
$R_{target}^n$ target is a target data rate of user n;
$R_{max}^n$ is a maximum aggregate transmit power of the user n.

In yet another embodiment, the optimization problem is solved by a dual decomposition combined with a convex relaxation.

According to a next embodiment, the optimization problem is solved by decomposing a Lagrangian $$\Lambda = \Delta(s(i), s_{new}) + \sum_n \omega^n (R_{target}^n - R^n(i)) + \sum_n \lambda^n \left( \sum_k s_k^n(i) - P_{max}^n \right)$$

wherein
$\omega^n$ is a dual variable corresponding to the data rate constraint of user n; and
$\lambda^n$ is a dual variable corresponding to the power constraint, into per-tone Lagrangians $\Lambda_k$ according to $$\Lambda = \sum_k \Lambda_k + \underbrace{\sum_n \omega^n R_{target}^n - \sum_n \lambda^n P_{max}^n}_{const.\ in\ s(i)}$$

with $$\Lambda_k = \sum_n \left( \frac{s_k^n(i)}{s_{k,new}^n} - 1 \right)^2 + \sum_n \lambda^n s_k^n(i) - f_s \sum_n \omega^n \log_2 \left( 1 + \frac{1}{\bar{\gamma}\Gamma} \frac{g_k^{n,n} s_k^n(i)}{\sum_{m \neq n} g_k^{n,m} s_k^m(i) + \sigma_k^2} \right).$$

Pursuant to yet an embodiment, a dual problem $$\max_{\omega^n, \lambda^n \forall n \in \mathcal{G}_i} \min_{s_k^n(i) \forall n \in \mathcal{G}_i, k} \Lambda$$

s.t. $\omega^n, \lambda^n \geq 0 \quad \forall n$ $0 \leq s_k^n(i) \leq s_{k,mask}^n \quad \forall n, k$ of the optimization problem is solved by solving K independent sub-problems $$\min_{s_k^n(i) \forall n \in \mathcal{G}_i} \Lambda_k$$

s.t. $0 \leq s_k^n(i) \leq s_{k,mask}^n \quad \forall n$ per Lagrange multiplier search step.

Hence, this approach renders the overall algorithm complexity linear in K.

According to another embodiment,
at an initial step i=0, it is determined whether the minimum SNR margin $\bar{\gamma}$ with $1 \leq \bar{\gamma} \leq \gamma_{target}$ exists so that the optimization problem is feasible for s(0);
wherein in case such minimum SNR margin $\bar{\gamma}$ exists, this value is used to determine the at least one intermediate power allocation;

wherein in case no such minimum SNR margin $\bar{\gamma} \geq 1$ (0 dB) exists, the set $\mathcal{G}_0$ is augmented by at least one additional user whose power allocation is re-shaped at the time instant $t=t_0$.

By enlarging the set of feasible power allocations, a low intermediate minimum SNR margin $\bar{\gamma}$ increases the flexibility of shaping the power allocations and thus tends to reduce the number of required intermediate steps i before all users reach the value of the new (target) power allocation $s_{new}$. Hence, a trade-off decision can be made between a faster convergence and a reduced protection against fluctuation of noise.

In the latter case (in case no such minimum SNR margin $\bar{\gamma} \geq 1$ exists), a forced resynchronization of these augmented users can be conducted.

The problem stated above is also solved by a device comprising or being associated with a processing unit that is arranged such that the method as described herein is executable thereon.

It is further noted that said processing unit can comprise at least one, in particular several means that are arranged to execute the steps of the method described herein. The means may be logically or physically separated; in particular several logically separate means could be combined in at least one physical unit.

Said processing unit may comprise at least one of the following: a processor, a microcontroller, a hard-wired circuit, an ASIC, an FPGA, a logic device.

Pursuant to an embodiment, the device is a modem, a DSLAM or a centralized network component, in particular a spectrum management center.

The solution provided herein further comprises a computer program product directly loadable into a memory of a digital computer, comprising software code portions for performing the steps of the method as described herein.

In addition, the problem stated above is solved by a computer-readable medium, e.g., storage of any kind, having computer-executable instructions adapted to cause a computer system to perform the method as described herein.

Furthermore, the problem stated above is solved by a communication system comprising at least one device as described herein.

Embodiments of the invention are shown and illustrated in the following figures:

DESCRIPTION OF THE INVENTION

The solution provided herewith suggests determining intermediate power allocations for users initializing a new session and to provide a favorable transition phase so that the xDSL system can eventually reach a new (target) multi-user power allocation that may be determined by an SMC.

It is noted that the power allocation is also referred to as a (transmit) spectrum. A user referred to herein may also be regarded as terminal, CPE or modem (or vice versa).

The intermediate power allocations (of the transition phase towards the new power allocation) can be determined such that an SNR margin for all users does not fall below a pre-defined threshold.

The updating scheme suggested in particular updates or adjusts the power allocation if a user (modem) initializes a new session. Hence, forced retraining of modems can be largely avoided. The intermediate power allocations can be determined utilizing spectral limitation masks as well as a limited power budget per modem, which is distributed among tones of a DMT modulation scheme.

Overview: Determining Intermediate Power Allocations

The solution provided in particular utilizes the following input:

(a) a new (target, multi-user) power allocation $s_{new}$ to which all users should eventually be updated; and
(b) a minimum SNR margin $\bar{\gamma}$.

At each time instance when at least one user is about to initialize a new session, a (further) intermediate power allocation for this at least one user is determined such that a distance metric between the intermediate (multi-user) power allocation and the new power allocation $s_{new}$ is reduced, in particular minimized and at least one of the following constraints can be met:

(a) a total transmit power is limited;
(b) a transmit power on each sub-carrier (DMT tone) is limited individually by a PSD mask;
(c) for a given minimum SNR margin $\bar{\gamma}$, a data rate achieved by each user with the obtained power allocation equals or exceeds a predetermined target data rate.

These constraints lead to an optimization problem (details, see below with regard to equation (14)), which can be solved in an efficient manner by a dual decomposition approach combined with a convex relaxation technique.

The minimum SNR margin $\bar{\gamma}$ may be chosen individually for every optimization stage, for every subcarrier (or a portion thereof) and/or individually for each user whose transmit spectrum is to be (re-)computed.

Figure 4:
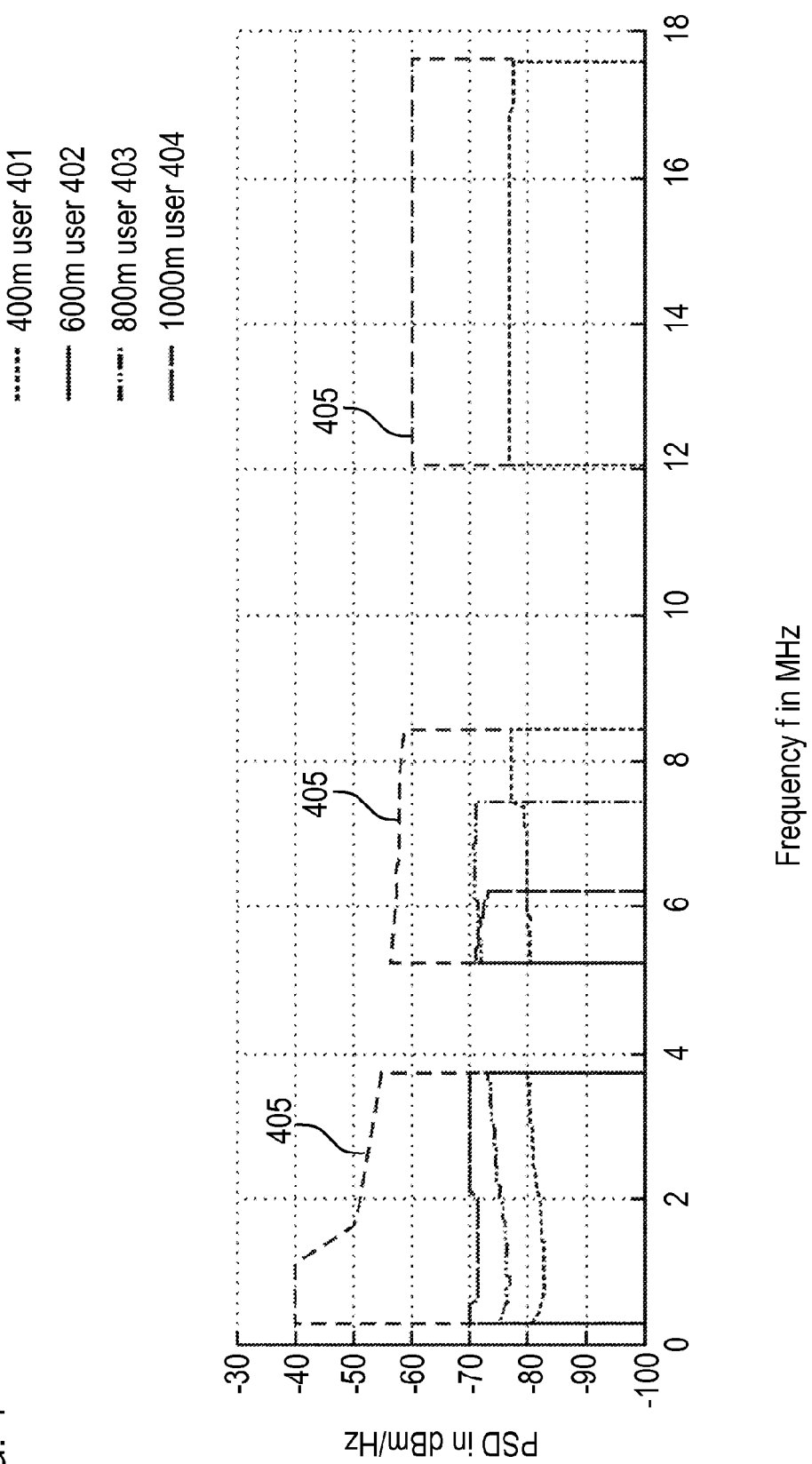
FIG. 4 shows a diagram visualizing a PSD over a frequency, wherein a PSD mask provides an admissible power allocation range, which is utilized by three users at an initial power allocation state $s_{old}$.

FIG. 4 shows a (downstream) multi-user power allocation at an initial state, also referred to as power allocation $s_{old}$ for a DSM system comprising three VDSL users with loop lengths of X meters, wherein X amounts to 400, 800 and 1000. The respective user is also referred to as the X m user. Hence, FIG. 4 depicts a PSD mask 405 and power allocations for the 400 m user 401, the 800 m user 403 and the 1000 m user 404.

Figure 5:
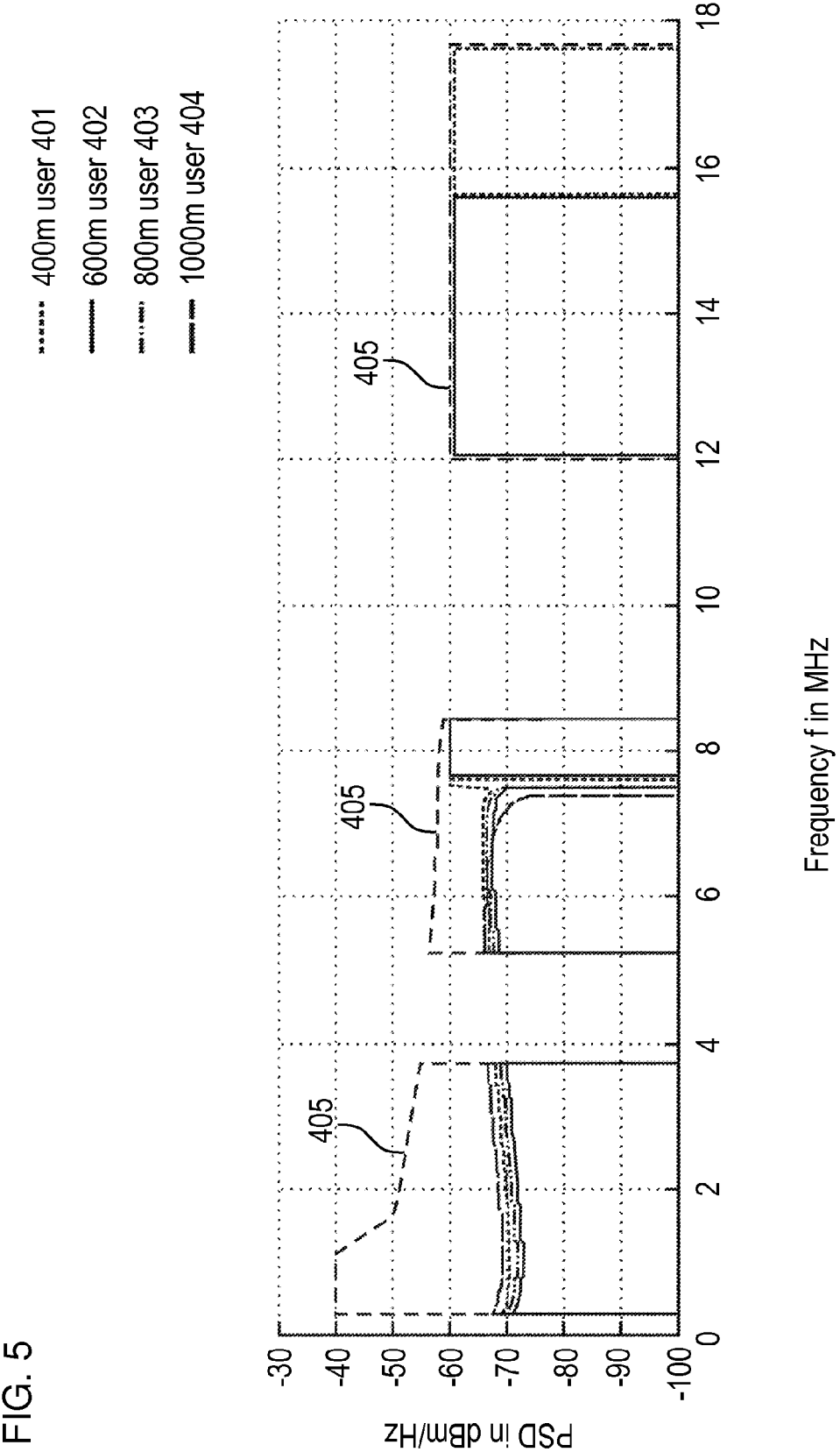
FIG. 5 shows based on FIG. 4 a new (target) power allocation $s_{new}$ in case an additional user joins the DSM system.

At a time instance $t=t_0$, a new user, also referred to as 600 m user 402 (because of its loop length amounting to 600 m) joins the DSM system and starts a new session so that the SMC has to re-calculate the power allocation, i.e. determine the new optimized allocation $s_{new}$ for the 4-user system. Such new power allocation $s_{new}$ is shown in FIG. 5. It is noted that both power allocations $s_{old}$ and $s_{new}$ provide a target SNR margin amounting to 6 dB.

In case the 400 m user 401, the 800 m user 403 and the 1000 m user 404 users are already in show-time at the time instance $t=t_0$, they cannot be updated instantly to the new power allocation $s_{new}$ without causing an interruption of service. Hence, these 401, 403 and 404 users are gradually updated, i.e. an update for the user in show-time is delayed until this user conducts a re-initialization phase for a next session.

Figure 6:
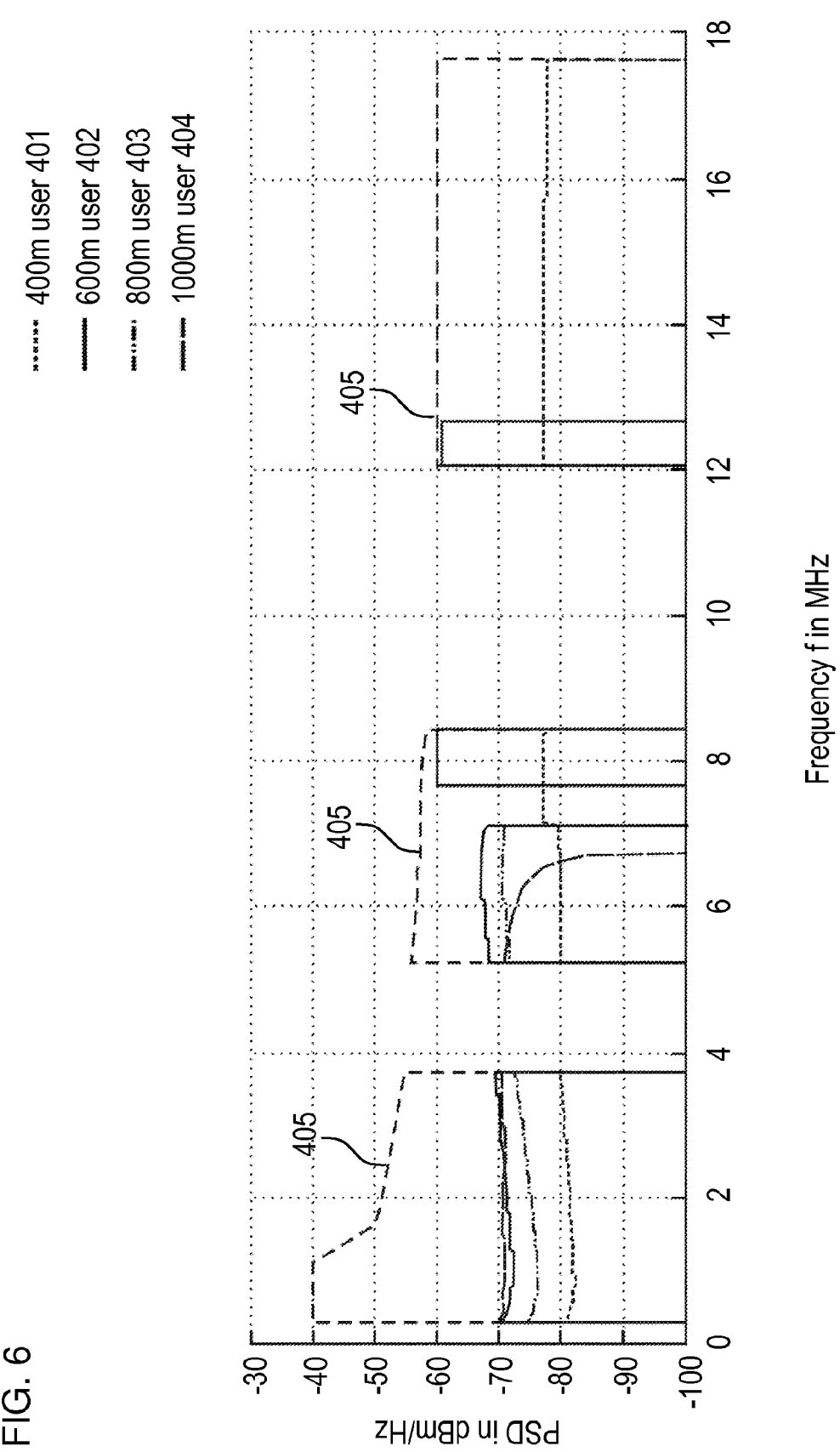
FIG. 6 shows based on FIG. 4 an intermediate power allocation s(i) that allows adjusting the DSM system towards the new power allocation $s_{new}$, but avoids a re-configuration of users that are still active (in show-time) and provides sufficient SNR margin to allow the DSM system to efficiently maintain its operation.

On the other hand, the power allocation for the newly joined 600 m user 402 cannot immediately be configured to the new power allocation $s_{new}$ without the risk of causing a severe drop of the SNR margin to any (or to all) of the 4 users. Therefore, an intermediate power allocation $s(i)$ is determined as shown in FIG. 6 for this 600 m user 402 to be applied at the time instance $t=t_0$, which guarantees that all users operate with an SNR margin equal or above a given SNR minimum margin (which can be set to, e.g., 2 dB). Also, the spectrum allocated for the 600 m user 402 for this intermediate power allocation $s(i)$ is selected to converge towards the new power allocation $s_{new}$; the other users (which are in show-time according to this example) maintain operation with their previously set configurations. The same procedure can then iteratively be applied to each user starting a new session after this time instance $t=t_0$ until the entire DSM system reaches and utilizes the new power allocation $s_{new}$. In practice, this may require for some users multiple intermediate transmit power allocations until the DSM system reaches said new power allocation $s_{new}$.

System Model for a Static Scenario

A channel model for a static DSL system comprises a set $\mathcal{N}$ of users sharing the same binder, thus causing mutual FEXT on each other's lines. By employing DMT transmission with K orthogonal tones $k=1, \ldots, K$, the interference channel is divided into K independent subchannels k. Applying a sufficiently small tone spacing $\Delta f$, the direct channel of user $n \in \mathcal{N}$ on tone k can be described by a single complex coefficient $h_k^{n,n}$. Similarly, a crosstalk channel from a disturber m to a victim line n on the tone k can be given by a complex scalar $h_k^{n,m}$ ($m \neq n$).

$s_k^n$ denotes a PSD of the transmit signal of a user n and $\sigma_k^2$ denotes a combined PSD of alien FEXT and receiver background noise on the tone k.

Using a Shannon gap approximation, a number of bits $b_k^n(\gamma)$ per symbol that a user n can load onto the tone k with a given SNR margin $\gamma \geq 1$ amounts to $$b_k^n(\gamma) = \log_2\left(1 + \frac{1}{\gamma \Gamma} \frac{g_k^{n,n}}{\sum_{m \neq n} g_k^{n,m} s_k^m + \sigma_k^2}\right), \quad (1)$$

where
$\Gamma > 1$ denotes a so-called gap to capacity, which is a function of a target BER;
$g_k^{n,m} = |h_k^{n,m}|^2$ are the crosstalk and direct channel gain coefficients.

Furthermore, a total utilized power $P^n$ and a data rate $R^n$ of the user n are given by $$P^n = \Delta f \sum_k s_k^n \text{ and} \quad (2)$$

$$R^n(\gamma) = f_s \sum_k b_k^n(\gamma), \quad (3)$$

respectively, where $f_s$ is a symbol rate of the DMT system.

Update of Multi-User Power Allocation in a Non-Static Scenario

In a DSM system, regardless whether operating in rate-adaptive, margin-adaptive or fixed-margin mode, the optimal joint power allocation is determined using a spectrum balancing algorithm which typically accounts for at least three per-user constraints in the optimization process:

(a) A total power constraint $$P^n \leq P_{max}^n \forall n, \quad (4)$$

where $P_{max}^n$ is a maximum aggregate transmit power specified in the respective xDSL standard;

(b) A spectral mask constraint $$0 \leq s_k^n \leq s_{k,mask}^n \forall n,k, \quad (5)$$

where $s_{k,mask}^n$ is a PSD mask determined by a band profile used; and (c) A rate constraint $$R^n(\gamma) \geq R_{target}^n \forall n, \quad (6)$$

where $R_{target}^n$ is a target data rate of user n chosen according to a Service Level Agreement and $\gamma$ amounts to a value $\gamma_{target} > 1$ which is a target SNR margin selected by the provider.

Next, a non-static scenario is considered in which an optimized power allocation $$s_{old} = \{s_{k,old}^n | n \in \mathcal{N}, k=1,\ldots,K\}, \quad (7)$$

computed by the SMC becomes invalid at some time instance $t=t_0$ when a user joins or leaves the DSM system or in case a user changes the service. In this case, a new power allocation $$s_{new} = \{s_{k,new}^n | n \in \mathcal{N}, k=1,\ldots,K\} \quad (8)$$

is required, which is optimized for a time $t \geq t_0$, but cannot be applied for those users that are already in show-time without interrupting their service.

Figure 1:
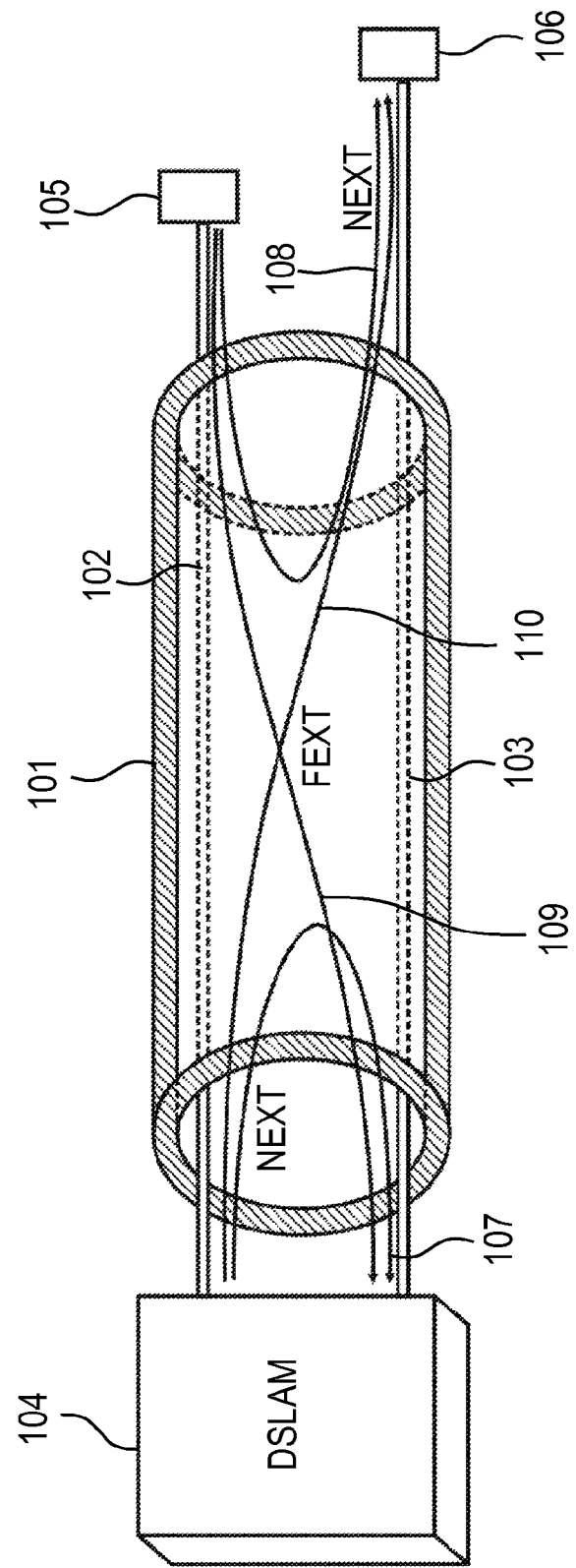
FIG. 1 is a schematic diagram of a cable having several lines.
Figure 2:
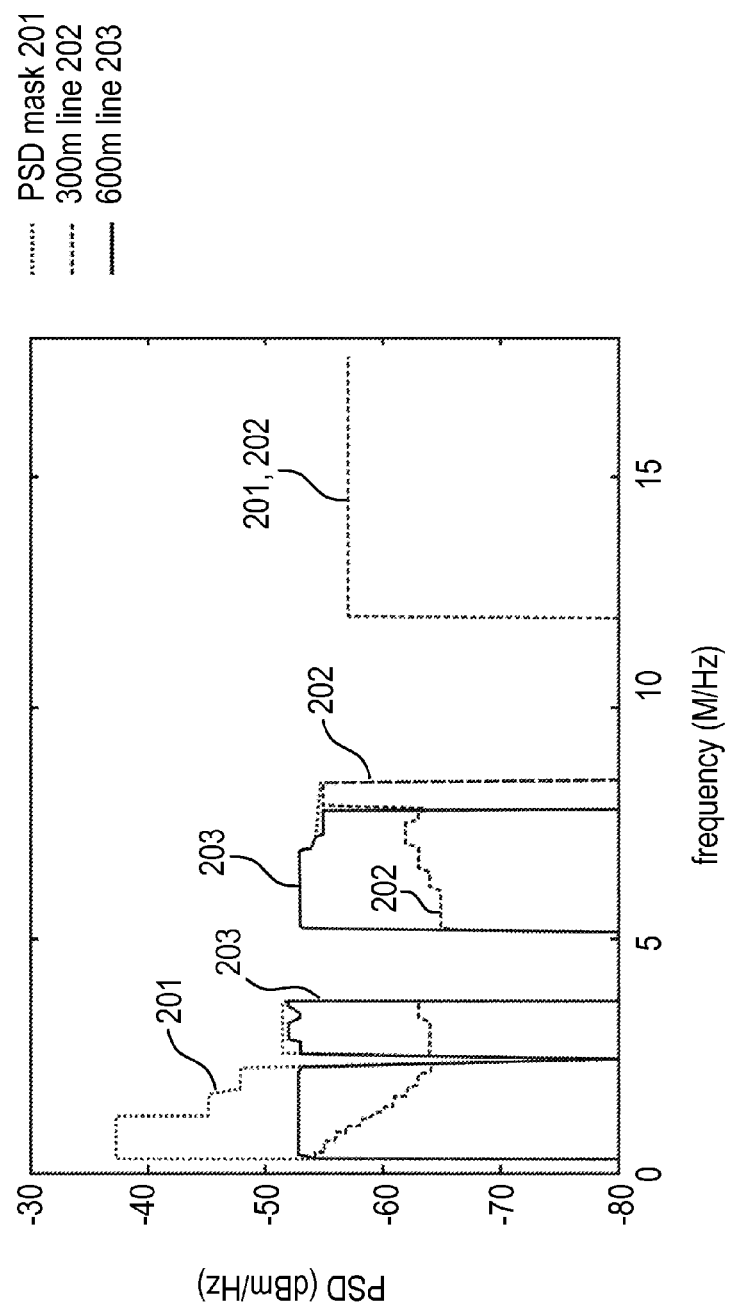
FIG. 2 is a schematic diagram of an optimal downstream power allocation for a VDSL2 system with two users.
Figure 3:
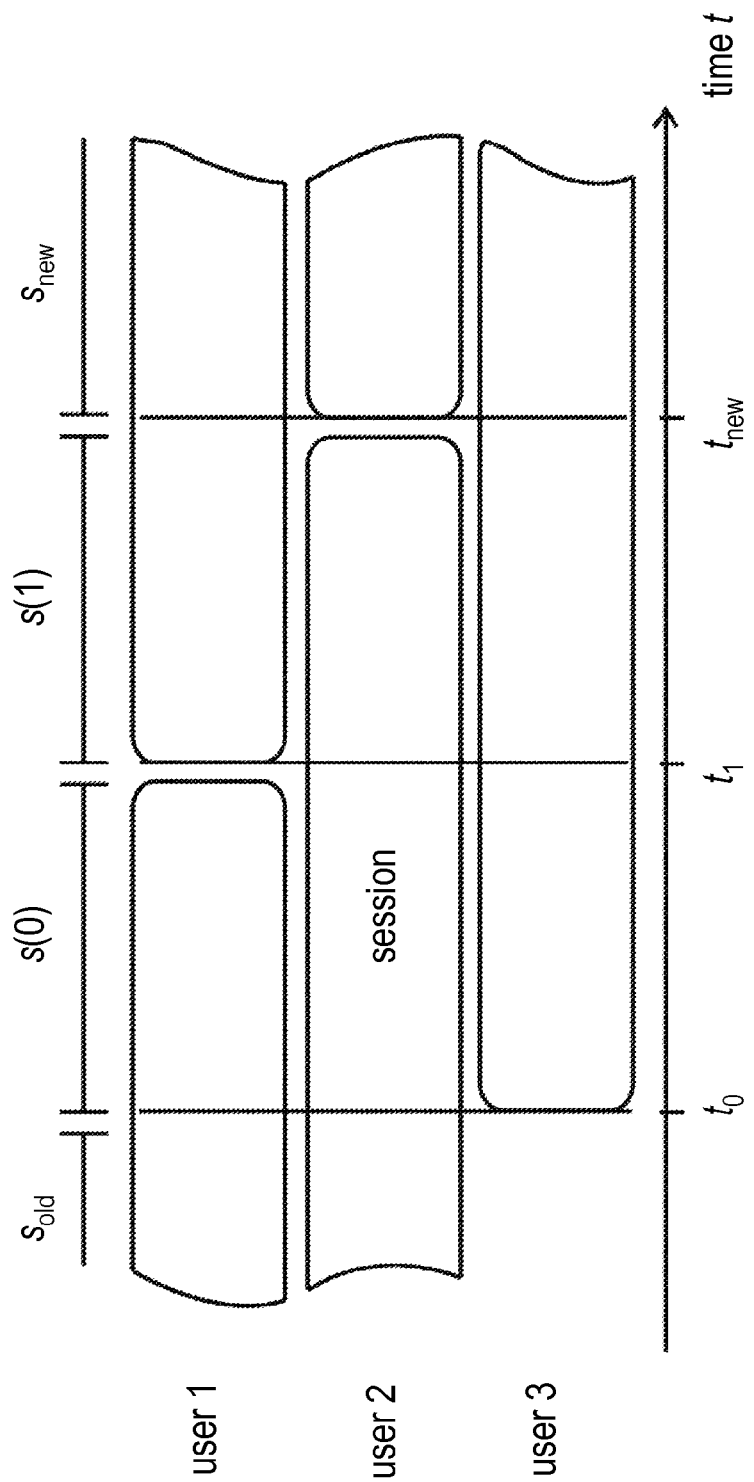
FIG. 3 shows a schematic diagram of a transition of a multi-user power allocation after a user 3 has joined the DSM system at a time instance $t=t_0$.

FIG. 3 shows a schematic diagram of a transition of a multi-user power allocation after a user 3 (n*=3) has joined the DSM system at a time instance $t=t_0$. The new power allocation $s_{new}$ is determined such that the constraints according to equations (4) and (6) are met for all users $n \in \mathcal{N}$, with $\mathcal{N} = \{1,2,3\}$; the constraints according to equations (4) and (6) are met for the old power allocation $s_{old}$ for users $n \in \{1,2\}$ without the user n* (user 3) being active prior to the instant of time $t < t_0$, i.e. the PSD $s_{k,old}^{n*} = 0 \forall k$.

If all users $n \neq n^*$ are already in show-time at the time instant $t=t_0$, only the transmit PSD $s_k^{n^*}$ of this newly joined user n* can be updated.

Time instances or steps $i=0,1,2,\ldots$ are defined in a discrete time range corresponding to time instances $t=t_i$ ($t_i < t_{i+1}$) in a continuous time range at which point any of the users initiates a new session and therefore its transmit PSD can be re-configured towards the new power allocation $s_{new}$.

In addition, $$s(i) = \{s_k^n(i) | n \in \mathcal{N}, k=1,\ldots,K\} \quad (9)$$

denotes a power allocation used by the system during an intermediate time interval $\theta_i = t_i \leq t < t_{i+1}$. Hence, if a user n is not re-initialized at an instance i, no convergence towards the new power allocation $s_{new}$ is reached, i.e. $s_k^n(i) = s_k^n(i-1) \forall k$.

In order to achieve an intermediate power allocation that converges toward the new power allocation $s_{new}$, the user n*'s PSD $s_k^{n*}(0)$ could be initialized at an instance i=0 to correspond to the new optimal allocation $s_{k,new}^{n*}$, while the other users $n \neq n^*$ maintain transmission with the previously determined (then optimal) spectra, i.e.

$$s_k^n(0) = \begin{cases} s_{k,new}^n & n = n^* \\ s_{k,old}^n & n \neq n^* \end{cases} \forall k = 1,\ldots,K. \quad (10)$$

At a next instance i=1, a user 2 is re-initialized and its transmit PSD $s_k^2(1)$ could be set to $s_{k,new}^2$, wherein the other users maintain their spectra (as they are still in show-time), i.e.

$$s_k^n(1) = \begin{cases} s_{k,new}^n & n = 3 \\ s_k^n(0) & n \neq 3 \end{cases} \quad (11)$$

$$\forall k = 1,\ldots,K.$$

If each user has been re-initialized, e.g., at least one time, the DSM system is fully updated and has reached its new power allocation $s_{new}$.

On the other hand, during the transition phase described, another event could invalidate the previously determined new power allocation $s_{new}$. In this case, a revised a new optimal power allocation $s_{new}$ may be determined and the power allocation $s_{old}$ is set to the current power allocation.

During each interval $\theta_2$, an actual SNR margin $\gamma^n(i)$ of the user n resulting from a given multi-user power allocation s(i) can be obtained by solving the equation $$R^n(\gamma^n(i))|_{s(i)} - R_{target}^n = 0 \quad (12)$$

However, it cannot be guaranteed that any of the intermediate allocations s(i), which are a mixture of old and new optimized power spectra, are feasible, i.e. yield a solution $\gamma^n(i) \geq 1$ for equation (12).

Proposal for New Updating Scheme

An approach is suggested that enables seamless transition from the old power allocation $s_{old}$ to the new power allocation $s_{new}$ in the DSM system. Hence, intermediate power allocations s(i) are determined such that at all times the actual SNR margin $\gamma^n(i)$ is guaranteed not to fall below a specified minimum value $\bar{\gamma}$.

This can in particular be achieved by shaping the intermediate spectra s(i) at each instance i towards (in particular as similar as possible) the new (target) power allocation $s_{new}$, while accounting for per-user power and target rate constraints.

Such similarity between the intermediate power allocation s(i) and the new (target) power allocation $s_{new}$ can be determined based on a distance function $$\Delta(s(i), s_{new}) = \sum_n \sum_k \left(\frac{s_k^n(i)}{s_{k,new}^n} - 1\right)^2, \quad (13a)$$

or $$\Delta(s(i), s_{new}) = \sum_n \sum_k \alpha_k^n (s_k^n(i) - s_{k,new}^n)^2, \quad (13b)$$

or $$\Delta(s(i), s_{new}) = \sum_n \sum_k \alpha_k^n \left(\frac{s_k^n(i)}{s_{k,new}^n} - \frac{s_{k,new}^n}{s_k^n(i)}\right)^2, \quad (13c)$$

which reaches 0 for $s(i) = s_{new}$.

It is noted that a distance metric according to $\Delta(s(i),s_{new})$ may comprise at least one of the properties:

$\Delta$ is convex in $s_k^n$;

$\Delta$ is separable in $s_k^n$; and $\Delta(s(i),s_{new})$ has a unique global minimum for $s(i)=s_{new}$.

In order to avoid division by zero, the term $s_{k,new}^n$ can be lower-bounded to some sufficiently small positive value $s_{min}$. For example, a value of −130 dBm/Hz could be useful for DSL applications.

At an instance users $n \in \mathcal{G}_i \subseteq \mathcal{N}$ are about to resynchronize. Based on a predetermined minimum SNR margin $\bar{\gamma}$, the intermediate power allocation s(i) is obtained by solving the following optimization problem $$\min_{s_k^n(i)\forall n\in\mathcal{G}_i,k} \Delta(s(i),s_{new}) \quad (14)$$

$$\text{s.t.} \quad R^n(\bar{\gamma})|_{s(i)} \geq R_{target}^n \quad \forall n$$

$$\sum_k s_k^n(i) \leq P_{max}^n \quad \forall n$$

$$0 \leq s_k^n(i) \leq s_{k,mask}^n \quad \forall n,k$$

Wherein the spectra for users $n \notin \mathcal{G}_i$ are maintained unchanged according to $$s_k^n(i) = \begin{cases} s_{k,old}^n & i=0 \\ s_k^n(i-1) & i>0 \end{cases} \quad (15)$$

$$\forall n \notin \mathcal{G}_i; k=1,\ldots,K.$$

An efficient solution of the problem according to equation (14) will be shown and explained below.

A convergence analysis of the proposed scheme could be summarized as follows: Basically, a sequence of optimized power allocations $\{\Delta(s(i),s_{new})\}$ is monotonously decreasing, i.e.

$$\Delta(s(i),s_{new}) \leq \Delta(s(i-1),s_{new}). \quad (16)$$

In practical scenarios, DSL sessions are of limited (finite) duration and for every instance i with $s \neq s_{new}$, there will always be a succeeding instance j>i such that $$\Delta(s(j),s_{new}) < \Delta(s(i-1),s_{new}), \quad (17)$$

which implies convergence of the system to finally reach the new power allocation $s_{new}$ within a finite number of (time) steps.

An existence of a feasible intermediate power allocation s(i) can be shown by the following induction: If a feasible solution for the intermediate power allocation s(i) exists, this solution will also be feasible for a succeeding intermediate power allocation s(i+1). The remaining issue is to find an initial power allocation s(0) that also is feasible.

As discussed above, there is no guarantee that a service with pre-defined target rates and pre-defined target BER can be maintained for all users once the newly joined user n* becomes active. Thus, at the initial step i=0, it has to be determined whether a minimum SNR margin $\bar{\gamma}$ with $1 \leq \bar{\gamma} \leq \gamma_{target}$ exists so that equation (14) with $\mathcal{G}_0 = \{n^*\}$ is feasible for s(0). If such a minimum SNR margin $\bar{\gamma}$ is found, this value can be used to determine all intermediate power allocations.

By enlarging the set of feasible power allocations, a low intermediate margin $\bar{\gamma}$ increases the flexibility of shaping the spectra and thus tends to reduce the number of required intermediate steps i before all users can be set to the new (target) power allocation $s_{new}$. Hence, a trade-off decision can be made between a faster convergence and a reduced protection against fluctuation of noise.

If, however, no feasible $\bar{\gamma} \geq 1$ exists, the set $\mathcal{G}_0$ can be augmented by one or more additional users whose spectra are to be re-shaped at the time instant $t=t_0$. In this case, a forced resynchronization of these users may be required.

Low-Complexity Solution

The objective to minimize the term $\Delta(s(i),s_{new})$ is convex in $s_k^n(i)$ and separable with regard to the tones k while the target rate constraint $R^n(\bar{\gamma})|_{s(i)} \geq R_{target}^n$ leads to a non-convex set of feasible solutions, making it difficult to find a solution that is guaranteed to be globally optimal.

It is thus suggested to decompose a Lagrangian $$\Lambda = \Delta(s(i),s_{new}) + \sum_n \omega^n(R_{target}^n - R^n(i)) + \sum_n \lambda^n\left(\sum_k s_k^n(i) - P_{max}^n\right) \quad (18)$$

wherein $\omega^n$ is a dual variable corresponding to the data rate constraint of user n; and $\lambda^n$ is a dual variable corresponding to the power constraint, into per-tone Lagrangians $\Lambda_k$ according to $$\Lambda = \sum_k \Lambda_k + \underbrace{\sum_n \omega^n R_{target}^n - \sum_n \lambda^n P_{max}^n}_{const.\ in\ s(i)} \quad (19)$$

with $$\Lambda_k = \sum_n \left(\frac{s_k^n(i)}{s_{k,new}^n} - 1\right)^2 + \sum_n \lambda^n s_k^n(i) - f_s \sum_n \omega^n \log_2\left(1 + \frac{1}{\bar{\gamma}\Gamma} \frac{g_k^{n,n} s_k^n(i)}{\sum_{m\neq n} g_k^{n,m} s_k^m(i) + \sigma_k^2}\right). \quad (20)$$

This allows solving the dual problem $$\max_{\omega^n,\lambda^n\forall n\in\mathcal{G}_i} \min_{s_k^n(i)\forall n\in\mathcal{G}_i,k} \Lambda \quad (21)$$

$$\text{s.t.} \quad \omega^n,\lambda^n \geq 0 \quad \forall n$$

$$0 \leq s_k^n(i) \leq s_{k,mask}^n \quad \forall n,k$$

of the problem according to equation (14) by solving K independent sub-problems $$\min_{s_k^n(i)\forall n\in\mathcal{G}_i} \Lambda_k \quad (22)$$

$$\text{s.t.} \quad 0 \leq s_k^n(i) \leq s_{k,mask}^n \quad \forall n$$

per Lagrange multiplier search step, thus rendering the overall algorithm complexity linear in K.

As $\Lambda_k$ is non-convex, minimization may however still require an exhaustive search with exponential complexity in the number of users N. For the rate-adaptive spectrum management problem, [P. Tsiaflakis, J. Vangorp, M. Moonen and J. Verlinden: Convex Relaxation Based Low-Complexity Optimal Spectrum Balancing for Multi-User DSL. In Acoustics, Speech and Signal Processing, 2007, ICASSP 2007. IEEE International Conference, volume 3, pages II-349 to 111-352, April 2007] suggests an efficient algorithm based on convex relaxation by noting that the Lagrangian can be rewritten as a difference of convex (d.c.) functions. Rewriting $\Lambda_k$ as $$\Lambda_k = \sum_n \left( \frac{s_k^n(i)}{s_{k,new}^n} - 1 \right)^2 + \tag{23}$$

$$\underbrace{\sum_n \lambda^n s_k^n(i) - f_s \sum_n \omega^n \log_2 \left( \sum_{m \neq n} g_k^{n,m} s_k^m(i) + \sigma_k^2 + \frac{g_k^{n,n} s_k^n(i)}{\overline{\gamma}\Gamma} \right)}_{A} +$$

$$\underbrace{f_s \sum_n \omega^n \log_2 \left( \sum_{m \neq n} g_k^{n,m} s_k^m(i) + \sigma_k^2 \right)}_{B}$$

where part A is a convex and part B is a concave portion. Hence, the problem according to equation (14) exposes a d.c. structure and can thus be solved using the approach as described in [P. Tsiaflakis, J. Vangorp, M. Moonen and J. Verlinden: Convex Relaxation Based Low-Complexity Optimal Spectrum Balancing for Multi-User DSL. In Acoustics, Speech and Signal Processing, 2007, ICASSP 2007. IEEE International Conference, volume 3, pages II-349 to III-352, April 2007].

The solution for the per-tone sub-problem pursuant to equation (22) can be approximated by iteratively solving a sequence of relaxed convex minimization problems, wherein the solution of one iteration is used as an approximation point for finding a convex relaxation of $\Lambda_k$ in the next iteration. An adaption of the low-complexity algorithm to the optimization problem according to equation (14) can be realized accordingly.

FURTHER ADVANTAGES

The approach presented guarantees a minimum SNR margin for each user during each (intermediate) stage of an iterative optimization of the power allocation towards a target value $s_{new}$. Hence, by ensuring such minimum SNR margin, the service stability can be significantly improved as the DSM system can be well protected against fluctuations of noise that is not managed by the DSM system (i.e. the SMC). In addition, forced re-configuration or re-training of users that are already in show-time and hence service interruptions can be largely avoided.

LIST OF ABBREVIATIONS

| BER | Bit Error Rate |
| --- | --- |
| CPE | Customer Premises Equipment (DSL modem) |
| d.c. | difference of convex |
| DMT | Discrete Multi-Tone |
| DSL | Digital Subscriber Line |
| DSLAM | DSL Access Multiplexer |
| DSM | Dynamic Spectrum Management |
| PSD | Power Spectrum Density |
| SMC | Spectrum Management Center |
| SNR | Signal-to-Noise Ratio |

The invention claimed is:

1. A method for adjusting a power allocation of users in a digital subscriber line environment, which comprises the steps of:

determining an intermediate power allocation for at least one user initializing with the digital subscriber line environment based on a new power allocation determined for the digital subscriber line environment containing the at least one user, the intermediate power allocation providing a predefined minimum signal-to-noise ratio margin for active users of the digital subscriber line environment; and determining the intermediate power allocation such that a distance metric between an actual power allocation and the new power allocation is reduced:

wherein the distance metric comprises a distance function selected from the group consisting of:

$$\Delta(s(i), s_{new}) = \sum_n \sum_k \left( \frac{s_k^n(i)}{s_{k,new}^n} - 1 \right)^2;$$

$$\Delta(s(i), s_{new}) = \sum_n \sum_k \alpha_k^n (s_k^n(i) - s_{k,new}^n)^2;\ \text{and}$$

$$\Delta(s(i), s_{new}) = \sum_n \sum_k \alpha_k^n \left( \frac{s_k^n(i)}{s_{k,new}^n} - \frac{s_{k,new}^a}{s_k^n(i)} \right)^2;$$

wherein $s_k^n$ denotes a power spectrum density of a transmit signal of a user n;

k denotes a subchannel or tone;

$s_{new}$ is the new power allocation; and s(i) is the intermediate power allocation at a step i.

2. A method for adjusting a power allocation of users in a digital subscriber line environment, which comprises the steps of:

determining an intermediate power allocation for at least one user initializing with the digital subscriber line environment based on a new power allocation determined for the digital subscriber line environment containing the at least one user, the intermediate power allocation providing a predefined minimum signal-to-noise ratio margin for active users of the digital subscriber line environment;

wherein the intermediate power allocation is determined by solving a following optimization problem:

$$\min_{s_k^n(i) \forall n \in \mathcal{G}_i, k} \Delta(s(i), s_{new})$$

$$\text{s.t.}\ R^n(\overline{\gamma})|_{s(i)} \geq R_{target}^n \quad \forall n$$

$$\sum_k s_k^n(i) \leq P_{max}^n \quad \forall n$$

$$0 \leq s_k^n(i) \leq s_{k,mask}^n \quad \forall n, k$$

wherein $n \in \mathcal{G}_i \subseteq \mathcal{N}$ is the user;

$\mathcal{G}_i$ denotes a group containing the at least one user initializing with the digital subscriber line environment;

$\mathcal{N}$ denotes the users sharing a same binder;

$s_k^n$ denotes a power spectrum density of a transmit signal of a user n;

$s_{k,mask}^n$ is a PSD mask determined by a band profile used;

k determines a subchannel or tone;

$s_{new}$ is the new power allocation;

s(i) is the intermediate power allocation at a step i;

$\overline{\gamma}$ is the predefined minimum SNR margin;

$R^n$ is a data rate of the user n;
$R_{target}^n$ is a target data rate of user n; and
$P_{max}^n$ is a maximum aggregate transmit power of the user n.

3. The method according to claim 2, which further comprises solving the optimization problem via a dual decomposition combined with a convex relaxation.

4. The method according to claim 3, which further comprises solving the optimization problem by decomposing a Lagrangian $$\Lambda = \Delta(s(i), s_{new}) + \sum_n \omega^n (R_{target}^n - R^n(i)) + \sum_n \lambda^n \left( \sum_k s_k^n(i) - P_{max}^n \right)$$

wherein
$\omega^n$ is a dual variable corresponding to a data rate constraint of the user n; and
$\lambda^n$ is a dual variable corresponding to a power constraint, into per-tone Lagrangians $\Lambda_k$ according to $$\Lambda = \sum_k \Lambda_k + \underbrace{\sum_n \omega^n R_{target}^n - \sum_n \lambda^n P_{max}^n}_{const.\ in\ s(i)}$$

with $$\Lambda_k = \sum_n \left( \frac{s_k^n(i)}{s_{k,new}^n} - 1 \right)^2 + \sum_n \lambda^n s_k^n(i) - f_s \sum_n \omega^n \log_2 \left( 1 + \frac{1}{\bar{\gamma}\Gamma} \frac{g_k^{n,n} s_k^n(i)}{\sum_{m \neq n} g_k^{n,m} s_k^m(i) + \sigma_k^2} \right)$$

5. The method according to claim 4, wherein a dual problem $$\max_{\omega^n, \lambda^n \forall n \in \mathcal{G}_i} \min_{s_k^n(i) \forall n \in \mathcal{G}_i, k} \Lambda$$

$$\text{s.t.} \quad \omega^n, \lambda^n \geq 0 \quad \forall n$$

$$0 \leq s_k^n(i) \leq s_{k,mask}^n \quad \forall n, k$$

of the optimization problem is solved by solving K independent sub-problems $$\min_{s_k^n(i) \forall n \in \mathcal{G}_i} \Lambda_k$$

$$\text{s.t.} \quad 0 \leq s_k^n(i) \leq s_{k,mask}^n \quad \forall n$$

per Lagrange multiplier search step.

6. The method according to claim 2,
wherein at an initial step i=0, it is determined whether the minimum SNR margin $\bar{\gamma}$ with $1 \leq \bar{\gamma} \leq \gamma_{target}$ exists so that the optimization problem is feasible for s(0);
wherein in case where the minimum SNR margin $\bar{\gamma}$ exists, the value is used to determine the at least one intermediate power allocation;
wherein in case no such minimum SNR margin $\bar{\gamma} \geq 1$ exists, a set $\mathcal{G}_0$ is augmented by at least one additional user whose power allocation is re-shaped at the time instant $t=t_0$.

* * * * *